United States Patent [19]

Park et al.

[11] Patent Number: 5,180,751
[45] Date of Patent: Jan. 19, 1993

[54] POLYPROPYLENE FOAM SHEETS

[75] Inventors: John J. Park, Neenah, Wis.; Leon Katz, Stamford, Conn.; Norman G. Gaylord, New Providence, N.J.

[73] Assignee: James River Corporation of Virginia, Richmond, Va.

[21] Appl. No.: 886,818

[22] Filed: May 22, 1992

Related U.S. Application Data

[62] Division of Ser. No. 493,541, Mar. 14, 1990, Pat. No. 5,116,881.

[51] Int. Cl.$^5$ .............................................. C08J 9/34
[52] U.S. Cl. .................................... 521/51; 264/45.1; 264/45.5; 264/51; 264/53; 264/54; 521/79; 521/134; 521/143; 521/144
[58] Field of Search ................. 521/143, 134, 144, 51, 521/79; 264/45.1, 45.5, 51, 53, 54, 321

[56] References Cited

U.S. PATENT DOCUMENTS

| | | | |
|---|---|---|---|
| 3,637,458 | 1/1972 | Parrish | 245/45 |
| 3,787,443 | 1/1974 | Parrish | 264/54 |
| 3,819,784 | 6/1974 | Hasama et al. | 264/54 |
| 3,830,900 | 8/1974 | Winstead | 264/51 |
| 4,424,293 | 1/1984 | Nojiri et al. | 524/101 |
| 4,467,052 | 8/1984 | Barnwell et al. | 521/92 |
| 4,525,257 | 6/1985 | Kurtz | 522/161 |
| 4,940,736 | 7/1990 | Alteeping et al. | 521/79 |
| 5,116,881 | 5/1992 | Park et al. | 54/143 |

FOREIGN PATENT DOCUMENTS

| | | |
|---|---|---|
| 0071981 | 2/1933 | European Pat. Off. |
| 0001791 | 5/1979 | European Pat. Off. |
| 0122460 | 10/1984 | European Pat. Off. |
| 0178282 | 4/1986 | European Pat. Off. |
| 0178283 | 4/1986 | European Pat. Off. |
| 0181637 | 5/1986 | European Pat. Off. |
| 0190021 | 8/1986 | European Pat. Off. |
| 0291764 | 11/1988 | European Pat. Off. |
| 1400494 | 7/1975 | United Kingdom |
| 2099434A | 12/1982 | United Kingdom |

OTHER PUBLICATIONS

F. W. Billmeyer, *Textbook of Polymer Science*, 3d Ed, 186–219 (1984).
A. Nojiri, T. Sawazaki, T. Konishi, S. Kudo, S. Onobori Furukawa Review 2, 34–42 (1982) through Chem. Abs. 97.
K. W. Suh and D. D. Webb, "Cellular Materials", in Encyclopedia Polymer Science & Engineering 3, 1–59 (1985).
Y. D. Lee and L. F. Wand, J. Applied Polymer Science 32 (4) 4639–47 (1986).
J. S. Colton, Plastics Engineering 44(8), 53–55 (1988).

*Primary Examiner*—Morton Foelak
*Attorney, Agent, or Firm*—Sixbey, Friedman, Leedom & Ferguson

[57] ABSTRACT

A thermoformable, rigid or semi-rigid polypropylene foam sheet having a smooth surface and a uniform cell structure and a density of at least 2.5 lbs/ft$^3$ is prepared by extruding a mixture of a nucleating agent, a physical blowing agent and a polypropylene resin having a high melt strength and high melt elasticity.

10 Claims, 3 Drawing Sheets

POLYPROPYLENE FOAM SHEETS

This is a divisional application of Ser. No. 07/493,541, filed Nov. 14, 1990, now U.S. Pat. No. 5,116,881.

BACKGROUND OF THE INVENTION

1. Field of Invention

This invention relates to polypropylene foam sheets and a process for their manufacture. Specifically, this invention relates to polypropylene foam sheets which are rigid or semi-rigid and thermoformable into shaped articles for use in packaging and service applications.

2. Description of the Prior Art

A foamed plastic or cellular plastic has an apparent density which is decreased by the presence of numerous voids or cells dispersed throughout its mass (ASTM D883-80C). The cells may be interconnected (open-celled) and/or discrete and independent (closed-celled).

The prior art discloses various methods for the preparation of foamed plastics. These include leaching out a solid or liquid which is dispersed in a plastic, sintering small particles of a plastic and dispersing cellular particles in a plastic. However, the most widely used method involves the dispersion of a gaseous phase throughout a fluid polymer phase and the retention of the resultant expanded form.

The theory of the expansion process and the properties of various foamed plastics are reviewed in "Cellular Plastics", in Encyclopedia of Polymer Science and Engineering, vol. 3, pp. 1-59 (1985), which is incorporated herein by reference. As disclosed therein, the expansion process consists of three steps: creation of small discontinuities or cells in a fluid or plastic phase, growth of these cells to a desired volume and stabilization of the resultant cellular structure by physical or chemical means.

The formation of discontinuities or bubbles within the fluid polymer, may arise from gases that are injected into the fluid polymer, low boiling liquids that are incorporated into the system as blowing agents and volatilize due to increased temperature or decreased pressure, gases that are produced as a result of a chemical reaction within the fluid polymer and chemical blowing agents which undergo thermal decomposition to form a gas.

The rate of growth of the bubbles or cells depends upon the viscoelastic nature of the polymer phase, the blowing agent pressure, the external pressure on the foam, the cell size and the permeation rate of the blowing agent through the polymer phase.

Cell or bubble stabilization relates to cell wall stability and the drainage of material from the membrane or wall which separates cells. Increasing the viscosity of the fluid reduces the drainage effect. The viscosity increase may be caused by chemical reactions which increase molecular weight through polymerization or crosslinking, or by temperature reduction, ultimately below the second order transition or crystallization temperature to prevent polymer flow.

The present invention relates to rigid or semi-rigid foam sheets for use in food service applications. The prior art has utilized polystyrene for the manufacture of foam sheets for these applications. However, polystyrene articles suffer from low service temperature, and little or no photochemical or biological degradability and are relatively expensive.

Polypropylene does not have these undesirable characteristics. Various processes have been reported in the prior art for the preparation of flexible or rigid polypropylene foams. The processes are designed to promote the three-step process described hereinbefore, i.e. creation of cells in a fluid or plastic phase, growth of the cells and stabilization of the resultant cellular structure.

Blowing agents used in the preparation of polypropylene foam include azodicarbonamide (Lee et al, J. Appl. Polym. Sci. 32, 4639 (1986); EPO Pat. Appl. EP 190,021), chlorofluorocarbons (EPO Pat. Appl. EP 1791, EP 71,981, EP 181,637; U.K. Pat. 1,400,494; U.K. Pat. Appl. GB 2,099,434 A), carbon dioxide (EPO Pat. Appl. EP 291,764), hydrocarbons, e.g. propane, butane, pentane (U.K. Pat. 1,400,494; U.K. Pat. Appl. GB 2,099,434 A) and water (EPO Pat. Appl. EP 122,460).

Crystallization rate accelerators and/or nucleating agents used in the preparation of polypropylene foam include titanium dioxide (EPO Pat. Appl. EP 122,460; U.K. Pat. Appl. GB 2,099,434 A), talc (U.K. Pat. 1,400,494; U.K. Pat. Appl. GB 2,099,434 A), silica and silicates (EPO Pat. Appl. EP 1791; U.S. Pat. 4,467,052), zeolite 4A (EPO Pat. Appl. EP 178,282, EP 178,283), sodium benzoate (Colton, Plast. Eng. 44(8), 53 (1988) and dibenzylidene sorbitol (EPO Pat. Appl. EP 178,282).

Citric acid-sodium bicarbonate combinations are considered as blowing agents in some patents and as nucleating agents in other patents (EPO Pat. Appl. EP 178,283; U.K. Pat. 1,400,494; U.K. Pat. Appl. GB 2,099,434 A; U.S. Pat. No. 4,467,052).

The use of crosslinking agents during the preparation of a polypropylene foam has been reported in the prior art and include peroxides (Nojiri et al, Furukawa Review 2, 34 (1982) through Chem. Abstracts 97, 21725u (1982); EPO Pat. Appl. EP 181,637, 190,021) in the absence or presence of multifunctional vinyl monomers, azido functional silanes (EPO Pat. Appl. EP 181,637), vinyltrimethoxysilane (Lee et al, J. Appl. Polym. Sci. 32, 4639 (1986) and ionizing radiation in the presence of polyacrylic monomers (Nojiri et al, Furukawa Review 2, 34 (1982); U.S. Pat. No. 4,424,293).

Low density polypropylene foams "free from creases on the surface" have been prepared by incorporating high molecular weight fatty amides, amines or esters in the molten polyolefin (EPO Pat. Appl. EP 1791).

The prior art teaches that polypropylene is not a unique material, i.e. processes that are applicable to the preparation of foam or microcellular structures from other polymers are applicable to the preparation of polypropylene foams.

EPO Pat. Appl. EP 1791 describes "a process for the preparation of expanded thermoplastic synthetic resins" and discloses polyethylene, ethylene-vinyl acetate copolymer and isotactic polypropylene as the applicable thermoplastic resins.

EPO Pat. Appl. EP 71,981 describes "foamed polypropylene resin molded articles" and discloses the use of ethylene-propylene copolymer as well as polypropylene.

EPO Pat. Appl. EP 122,460 describes "resin foam produced by an aqueous medium" and discloses polymer foams from polypropylene, polyethylene and polystyrene.

EPO Pat. Appl. EP 291,764 describes the "extrusion of propylene polymer foam sheets" and discloses a process for extruding blends of ethylene-propylene block copolymers containing less than 20% ethylene with block copolymers containing less than 5% ethylene or random ethylene-propylene copolymers or polypropylene.

U.K. Pat. 1,400,494 describes "foamed polymeric sheet material and process therefor" and discloses polypropylene, high density polyethylene and nylon-12 as the preferred operable polymers while indicating that copolymers of ethylene with vinyl acetate or vinyl chloride can be conveniently used.

U.K. Pat. Appl. GB 2,099,434 A describes an "extrusion process for propylene resin foams' and states that the resin may be isotactic polypropylene, an ethylene-propylene block or random copolymer or blends of polypropylene with numerous olefin homopolymers and copolymers.

U.S. Pat. No. 3,637,458 describes "microcellular foam sheet" from a linear, thermoplastic crystalline polymer and claims isotactic polypropylene and linear polyethylene foam sheet.

U.S. Pat. No. 3,819,784 describes "a process for preparing molded polyolefin foam" and discloses that suitable polylefins used in the process include low density polyethylene, high density polyethylene, isotactic polypropylene, poly-1-butene and copolymers of ethylene with propylene or vinyl acetate.

U.S. Pat. No. 3,830,900 describes "method of forming foamed plastic sheets" and discloses that the method is applicable to polyvinyl chloride, polystyrene, polyethylene, polypropylene and acrylonitrile-butadiene-styrene copolymers.

U.S. Pat. No. 4,467,052 describes a "tray for packaging food products" and discloses an injection molding process for the preparation of foam trays from blends of polypropylene and styrene-butadiene rubber.

Colton (Plast. Eng. 44(8), 53 (1988) describes "making microcellular foams from crystalline polymers" and discloses microcellular polypropylene and ethylene-propylene copolymer foams.

EPO Pat. Appl. 181,637 describes "lightly cross-linked linear olefinic polymer foams" prepared from melt blends of one or more polymers selected from high density polyethylene, linear low density polyethylene, polypropylene and polystyrene.

EPO Pat. Appl. EP 190,021 describes "heat-foamable cross-linked propylene resin compositions" and discloses blends of propylene-α-olefin copolymers or 1-butene-α-olefin copolymers with polypropylene.

U.S. Pat. No. 4,424,293 describes "crosslinkable polypropylene composition" and discloses foams from isotactic polypropylene and ethylene-propylene copolymer.

The prior are uses "polypropylene" as a self-explanatory term for a polymer prepared from propylene monomer. In some cases, the terms "isotactic polypropylene" and "crystalline polypropylene" are used. In only a few patents is the polypropylene characterized to any further extent.

EPO Pat. Appl. EP 71,981 discloses polypropylene foams prepared from resins having a latent heat of crystallization of 9-28 cal/g. U.S. Pat. No. 3,637,458 discloses polypropylene foams prepared from polymers of "at least film forming molecular weight, substantially free from crosslinking, and having a work-to-break (WTB) value of at least 10,000 inch-lbs/inch$^3$". U.K. Pat. Appl. GB 2,099,434 A discloses polypropylene foams prepared from resins having a melt tension of at least 3 grams at 190° C. and a maximum/minimum melt tension ratio of not more than 2.5/1.

Application of the processes of the prior art to generic or commercial polypropylene resins, described as polypropylene, isotactic polypropylene or crystalline polypropylene, fails to yield the polypropylene foam sheet of the present invention.

SUMMARY OF THE INVENTION

An object of the present invention is to provide a foam sheet material having a high impact strength, a modulus suitable for rigid or semi-rigid packaging applications and convertible into trays, plates, containers and other articles used in food service.

Another object of the instant invention is to provide a thermoformable foam sheet which has a high service temperature.

A further object of the present invention is to provide a foam sheet having high insulation properties and cost advantages over existing foam sheets.

Yet another object of the present invention is to provide a foam sheet prepared from a polypropylene resin and having a density ranging from 2.5 to 25 lbs/ft$^3$ and a modulus of at least 10,000 psi.

Still another object of the present invention is to provide a polypropylene foam sheet having a uniform cell structure and smooth surfaces.

It has now been found that these improvements in a foam sheet can be achieved by extruding high melt strength, high melt elasticity polypropylene, characterized by at least (a) either high $M_z$ or high $M_z/M_w$ ratio, and (b) either high equilibrium compliance $J_{eo}$ obtained from creep measurements or high recoverable strain per unit stress Sr/S obtained from steady shear measurements.

In one embodiment, the present invention provides a rigid or semi-rigid polypropylene foam sheet having a density ranging from 2.5 to 25 lbs/ft$^3$, tensile and flexural moduli of at least 10,000 psi, a cell size of 5–18 mils and a thickness ranging from about 0.02 to 0.20 inches. The polypropylene foam sheet is thermoformable and has uniform cell structure and smooth surfaces.

In another embodiment of this invention, a process is provided for producing the polypropylene foam sheet of the invention. The process may be conducted using a single or tandem extrusion line. The latter is preferred and, by the use of primary and secondary extruders in series, a continuous foam sheet is produced. The process comprises mixing polypropylene resin, having a high melt strength and a high melt elasticity, with a nucleating agent in the primary extruder, plasticating the mixture, injecting a physical blowing agent into the plasticated mixture to form a foaming mixture, which is transferred to a secondary extruder, mixing and cooling the foaming mixture and extruding the foaming mixture through an annular or flat die into a continuous foam sheet.

In another embodiment of this invention, a method is provided for forming rigid or semi-rigid articles from the polypropylene foam sheet of the invention. The process comprises heating the foam sheet to a temperature which permits deformation under vacuum or pressure, supplying the softened foam sheet to a forming mold and cooling the foam sheet to form a rigid or semi-rigid article having the shape of the mold.

In another embodiment of the invention, a rigid or semi-rigid multilayer structure is provided. The multilayer structure comprises at least one layer of the polypropylene foam sheet of the invention and at least one layer having functional properties, e.g. barrier properties.

DETAILED DESCRIPTION OF THE INVENTION

Figure 1:
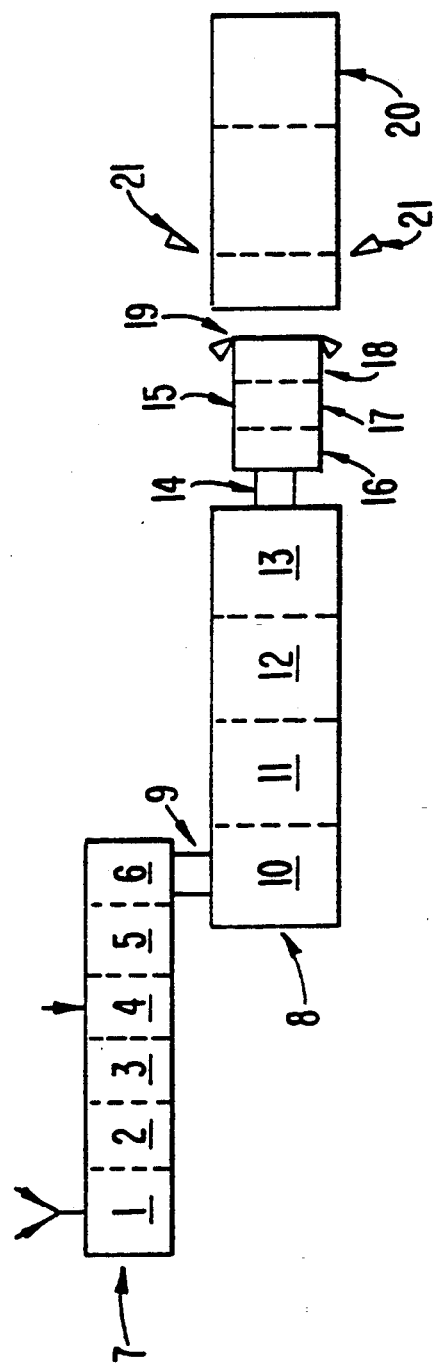
FIG. 1 is a schematic drawing of a tandem foam extrusion line.

In accordance with the present invention, it has been found that a thermoformable polypropylene foam sheet having high modulus, impact strength, service temperature and insulation properties, may be produced by a process which comprises the steps of mixing a polypropylene resin having specific molecular and rheological characteristics with a nucleating agent, plasticating the mixture, introducing a physical blowing agent into the plasticated mixture to form a foaming mixture, mixing, cooling and extruding the foaming mixture through an extruder die into a foamed extrudate which is formed into a continuous foamed sheet.

Acceptable foam sheets produced from the operable polypropylene resins by this process, have a density between 2.5 and 25.0 lb/ft$^3$, suitable for semi-rigid and rigid packaging and food service applications and have a substantially uniform cell structure and smooth surfaces. Foams which are unacceptable and unsatisfactory for thermoforming into objects for the indicated applications, have non-uniform cell structures, rough surfaces and densities outside of this range.

The base resin plays the major role in determining the foamability and the properties of the foam products made therefrom. The polypropylene resins which yield acceptable foams, particularly when processed by the method disclosed herein, may be distinguished from the polypropylene resins which yield unsatisfactory foams, by their molecular and rheological characteristics.

The melt strength of a polymer is important in processes such as foaming where deformation is primarily elongational and tensile stresses are present. High molecular weight polypropylene resins are frequently characterized as "high melt strength" (HMS) resins. However, unexpectedly, it has been found that this characterization is inadequate and that numerous high molecular weight polypropylene resins, designated and marketed as "high melt strength" resins fail to yield acceptable foam sheets.

The molecular weight distribution in a sample of polypropylene may be determined by high temperature gel permeation chromatography (GPC). The Waters 150 CV GPC chromatograph may be used at 135° C. with trichlorobenzene as carrier solvent and a set of Waters μ-Styragel HT, 10$^3$, 10$^4$, 10$^5$ and 10$^6$ Å columns. The solution concentration is 0.2% (w/v) and the flow rate is 1 ml/min.

GPC provides information about (a) the number average molecular weight $M_n$ which is the arithmetical mean value obtained by dividing the sum of the molecular weights by the number of molecules and thus is dependent simply upon the total number of molecules, (b) the weight average molecular weight ($M_w$) which is the second-power average of molecular weights and is more dependent on the number of heavier molecules than is $M_n$, and (c) the z-average molecular weight ($M_z$) which is the third-power average of molecular weights.

Colligative properties are related to $M_n$, bulk properties associated with large deformations such as viscosity and toughness are affected by $M_w$ values and melt elasticity is more closely dependent on $M_z$ values.

The polypropylene resins which are effective in yielding acceptable foams by the process of the present invention, are of high molecular weight with an $M_z$ value above $1.0 \times 10^6$ and an $M_z/M_w$ ratio above 3.0. The polydispersity index $M_w/M_n$ is of less significance since it does not differentiate between polypropylene resins which give acceptable foams and those which give unsatisfactory foams. Resins having $M_z$ and $M_z/M_w$ values below the indicated values yield foam sheets which are unacceptable.

GPC chromatograms of resins which yield unacceptable foam sheets, using a viscometer detector, show a unimodal molecular weight distribution and plots of the branching factor g' versus log molecular weight ($M_w$), where $$g' = [\eta]/KM^a$$

show the absence of significant branching, i.e. the chains are essentially linear. In contrast, resins which yield acceptable foam sheets show a bimodal molecular weight distribution, wherein the major component is largely linear while the higher molecular weight minor component is highly branched.

Melt flow rates of resins which may be utilized in the process of the present invention, range from 0.2 to 12 g/10 min, measured in a melt flow instrument at 230° C. under a load of 2.16 kg.

The importance of melt elasticity in the conversion of polypropylene resins to acceptable foam sheets, indicated by $M_z$ values, is confirmed by rheological characterization of polymer melts in a shear field.

The rheological characterization of the polypropylene resins was conducted with a programmed Rheometrics Mechanical Spectrometer (RMS-800). Resin pellets were compression molded into sheets from which samples were stamped out with a 25 mm diameter circular die. Tests were conducted at 210 ±1° C. using 25 mm parallel plate geometry with a 1.4 mm gap. Creep data were obtained under a constant stress of 1000 dyn/sq.cm for a period of 0–300 sec. The creep compliance J(t) is given by $$J(t) = \frac{\tau(t)}{\sigma_o} = J_{eo} + \frac{t}{\eta_o}$$

where
 $\tau$ = strain
 $\sigma$ = stress
 $J_{eo}$ = equilibrium compliance
 $\eta$ = zero shear viscosity The equilibrium compliance $J_{eo}$ is a measure of melt elasticity and is determined by first plotting strain against time at constant stress. The strain as a function of time is divided by the stress to give J(t). $J_{eo}$ is the intercept of the J(t) against time plot.

Polypropylene resins which yield acceptable foam sheets, by the process of the present invention, have equilibrium compliance $J_{eo}$ values above $12 \times 10^{-5}$ cm$^2$/dyne. Resins having $J_{eo}$ values below this value yield unacceptable foam sheets with non-uniform cell structure and uneven surfaces.

The recoverable shear strain per unit stress Sr/S also distinguishes polypropylene resins which yield acceptable foam sheets from those which yield unacceptable foam sheets. This quantity is a fundamental measure of melt elasticity. Using the programmed Rheometrics Mechanical Spectrometer, the polymer melt is subjected to clockwise rotational shear strain by the driver and the resulting shear stress S and first normal stress $N_1$ are measured by a transducer. The shear rate range is 0.01-10 s$^{-1}$, the time before measurement is 2.2 min and the time of the measurement is 0.3 min. Normal stress measurements are obtained at each shear rate. The recoverable shear strain Sr is obtained from the first normal stress difference $$Sr = \frac{N_1}{2S}$$

The normalized quantity Sr/S, i.e. recoverable shear strain per unit stress is a measure of melt elasticity. Polypropylene resins which are extrudable to acceptable foam sheets have Sr/S values at 1 sec$^{-1}$ above $5 \times 10^{-5}$ cm$^2$/dyne, generally above $7 \times 10^{-5}$ cm$^2$/dyne, while unacceptable foam sheets are obtained from resins with lower values.

In addition to the polypropylene resins which have the molecular and rheological characteristics indicated above, blends of polypropylene resins with other polymers are also of use in the practice of the present invention, provided said blends have the necessary molecular and rheological characteristics. Thus, blends of the polypropylene resins which are useful in the preparation of the foam sheets of this invention, with other polymers such as linear polypropylene or polyethylene resins may be used if such blends have the required characteristics. Further, blends of linear polypropylene resins with branched polyethylene or polypropylene resins may be used when such blends have the necessary molecular and rheological characteristics. The branched polyolefins may be prepared by exposure of the linear polyolefins to low level radiation, in accordance with U.S. Pat. No. 4,525,257 or by other appropriate methods.

In accordance with the present invention, an extrusion process is provided for converting the polypropylene resins having the necessary molecular and rheological characteristics to acceptable foam sheets. Twin or single screw extruders may be used. Single extruders or, preferably, primary and secondary extruders, generally called tandem extruders, are effective in conducting the mixture of polypropylene resin and additives through the necessary plasticating, mixing and cooling steps which are followed by extrusion to foam sheet having uniform cell structure and smooth surfaces.

A tandem extrusion line is schematically represented in FIG. 1. The base resin and the nucleating agent are added from separate feeders through a single port to the unheated zone 1 of the primary extruder 7. The mixture is moved by the plasticating and mixing screw through the heated zones 2-6. The blowing agent is added to the plasticating mixture in zone 4. The resultant "foaming mixture" is transferred to the secondary extruder 8 through the heated crossover 9. Mixing and cooling occur as the screw carries the mixture through heated zones 10-13. The melt pump 14 moves the "foaming mixture" into the heated die 15 and through zones 16-18. The die may be either a circular (annular) or flat die. The extruded foaming mixture forms a foamed extrudate which is sheet-like when coming through a flat die, or tubular when coming through an annular die. In either case, the extrudate is cooled by an air ring 19 attached to the die lip. If an annular die is used, the extruded foam tube is pulled over a cooling/sizing drum 20 where it is further cooled by an air ring 21. The extruded foam tube or sleeve is split while passing over the drum 20. The extrudate from either a flat die or an annular die, the latter after splitting and spreading, is then flattened into a foam sheet by passage over a series of rolls, e.g. an S-wrap, and then taken up on a winder. The continuous foam sheet is then aged for a period of time to allow for diffusion of the blowing agent and air through the cell walls to bring it to equilibrium, prior to further fabrication, if any.

The extrusion process disclosed above is representative and not limiting as to equipment and procedural details. Alternative equipment and variations in the procedure will be obvious to those skilled in the art.

A polypropylene foam sheet may be provided with a substantially non-cellular outer layer or skin. Such a skin may give the foam a superior outer appearance in that the foam structure with skin may have a shiny or glossy appearance, and is also resistant to surface abrasion and cutting. The skin also acts as a stiffener to enable a lighter and/or thinner structure having a maximum bending stiffness to be obtained. A skin may be formed on a single layer structure by changing the flow rate and/or the temperature of the air which is applied to the surface of the tubular or flat extrudate coming out of a die. Alternatively, a skin layer may be formed by using a multimanifold die or combining feedblock to coextrude a non-foamed polypropylene or other layer on the outside of a polypropylene foam layer.

In accordance with another embodiment of the present invention, a multilayer foam sheet is provided. This foam sheet comprises at least one layer of the polypropylene foam sheet of this invention and at least one functional layer. The presence of functional layers in the multilayered foam sheet of the invention can effectively act as a water vapor or gas barrier. The use of functional layers in combination with polypropylene foam layers thus can enable a product to be produced that is effective for use as a container which not only has the advantageous properties of the polypropylene foam, but in addition can act as a barrier to air or water vapor and thus can be useful in packaging applications where an extended shelf-life is desirable.

The functional layers which can be utilized in accordance with the present invention include ethylene-vinyl alcohol and vinylidene chloride copolymers and polyamides. A typical multilayered foam sheet configuration, in accordance with the invention, might include one or more functional layers sandwiched between two layers of polypropylene foam sheet. Typically, the thickness of the functional layer or layers will constitute less than about 5% of the total thickness of the multilayer construction. In cases where the materials utilized as the functional layer are not compatible with or adherent to the polypropylene foam layers, it may be desirable, in accordance with the invention, to utilize "tie" layers between the functional and polypropylene foam layers. These tie layers may function to hold the functional and polypropylene foam layers together and thus act as adhesives.

Typical tie layers are based on olefin copolymers containing polar functionality, e.g. ester, carboxyl and amide groups, generally prepared by copolymerization of an olefin monomer or graft copolymerization of an olefin polymer with one or more monomers containing the polar functionality. Thus, polypropylene-maleic anhydride and polypropylene-acrylic acid graft copolymers and the like are effective tie layers.

In accordance with the invention, a process is provided for producing a multilayered polypropylene foam sheet. The process comprises the steps of mixing pelletized polypropylene resin with a nucleating agent, plasticating the mixture, introducing a physical blowing agent into the substantially plasticated mixture to form a foaming mixture, mixing and cooling the foaming mixture, supplying the foaming mixture and a separately plasticated functional resin to a combining feedblock or multimanifold die of an extruder, and co-extruding the foaming mixture and plasticated functional resin into a continuous multilayered foam sheet. The latter may then be aged for a period of time prior to further processing, if any.

The process and materials utilized to form the foaming mixture are the same as those described earlier herein in the process for producing the single layer foam sheet. The polypropylene foam layers may be formed by use of tandem extruders, as in the single layer process. The functional layers utilized in the process for producing multilayered polypropylene foam sheets are preferably plasticated in separate, additional extruders. In addition, tie layers utilized between functional and polypropylene foam layers also may be fed from separate extruders.

In accordance with the invention, the polypropylene foaming mixture and the functional resin are combined by means of a multimanifold die, which has multiple inlet ports, or a combining feedblock, each of which is well known in the art. In addition, if the use of tie layers is desired, these materials may also be fed to the multimanifold die or combining feedblock. By means of the die or feedblock, three or more layer structures can be co-extruded by utilizing either an annular die with multiple inlet ports or a flat die utilizing multiple inlet ports or a combining feedblock. By the use of such equipment, it is possible to produce a multilayered foam structure having, for example, an outside polypropylene foam layer and an inside polypropylene foam layer with a functional layer sandwiched therebetween. In addition, tie layers may be utilized between the functional and polypropylene foam layers.

A skin may be formed on an outside polypropylene foam layer which is part of a multilayer structure in a similar manner to that used with a single layer structure.

The foaming mixture for the preparation of the polypropylene foam sheet of the present invention consists of the polypropylene resin, blowing agent and nucleating agent.

The molecular and rheological characteristics of the polypropylene used in the process of the present invention, have been described hereinbefore and include at least (a) either $M_z \geq 1.0 \times 10^6$ or $M_z/M_w \geq 3.0$ and (b) either $J_{eo} \geq 12 \times 10^{-5}$ cm$^2$/dyne or $Sr/S \geq 5 \times 10^{-5}$ cm$^2$/dyne at 1 sec$^{-1}$ In addition, operable polypropylenes include those having a bimodal molecular weight distribution, wherein the higher molecular weight fraction contains branched polymer.

Although the physical form of the resin is not significant, pelletized resin is preferred. The melt flow rate of the resin ranges from 0.2 to 12.0 g/10 min (2.16 kg, 230° C.).

The nucleating agent, which creates sites for bubble initiation, influences the cell size of the foamed sheet. The preferred nucleating agents include a mixture of citric acid and sodium bicarbonate, talc and titanium dioxide. Other inert solids used in the prior art and cited herein may also be used in the process of the present invention. The cited prior art nucleating agents are incorporated herein by reference. It is preferred that the nucleating agent have a particle size in the range of 0.3 to 5.0 microns and that its concentration be less than 1% by weight. This plays a role in the formation of 5-18 mil cells, suitable for thermoforming into rigid or semi-rigid articles for food service applications. Higher concentrations of nucleating agents result in a finer cell structure and the possibility of agent aggregation. When talc and other inert solids are used as nucleating agents, the concentration is somewhat higher than when the citric acid-sodium bicarbonate mixture is used.

The blowing agent used in the foaming mixture is a physical blowing agent which is either a gas or undergoes a phase change from liquid to gas during the foaming process. The blowing agent is used primarily for controlling the density of the foam. The agent dissolved in the polymer under high pressure and temperature, comes out of solution creating bubbles when the pressure and temperature decrease. The physical blowing agent acts as a plasticizer reducing the viscosity and lowering the temperature necessary to maintain the hot melt or plasticated condition of the foaming mixture.

The blowing agents used in accordance with the present invention include hydrocarbons such as butane and isopentane, chlorinated hydrocarbons, chlorofluorocarbons, nitrogen, carbon dioxide and other inert gases. The concentration of blowing agent is between 1 and 25% by weight, preferably 2-15%. The higher the concentration of the blowing agent, the lower the foam density due to the combined effects of higher pressure in the cell and the lower resistance of the cell wall to deformation because of the plasticizing action of the blowing agent. An increase in blowing agent concentration in the melt reduces the melt viscosity and the processing temperature.

The crystallization temperature from the melt is the lower limit in processing temperature. When crystallization occurs in the melt, the foaming characteristics change drastically, usually resulting in surface roughness and non-uniform cell size. A conventional non-nucleated polypropylene melt starts crystallizing at around 120° C. with a peak at around 110° C., while the polypropylene resins which are effective in the preparation of the foam sheets of the present invention, start to crystallize at about 140° C. with a peak at around 130° C. The lower melt temperature in the foaming process, the finer the cell size and the lower the open cell content. The lower limit for the polypropylene, isopentane, citric acid-sodium bicarbonate system is about 138° C.

The extruded polypropylene foam sheets of the present invention are aged for a period of time, e.g. 72 hours, before sheet characterization and thermoforming.

The density of the polypropylene foam sheet of the present invention is 2.5-25.0 lbs/ft$^3$ (ASTM D1622) and the thickness is 0.020-0.200 inches (ASTM D645). The tensile and flexural moduli of the foam sheet are in the 10,000 to 50,000 psi range.

The average size of the cells in the polypropylene foam sheet is determined by scanning electron microscopy. SEM micrographs are taken of cross sections of the sheet, examining both the machine and cross machine directions. The cell size is determined by counting the cells in a specific area, calculating the average area per cell and converting the area per cell into an average cell diameter. The cell diameters for the machine and cross machine directions are then averaged.

The average size of the cells in the polypropylene foam sheets of the present invention ranges from 5 to 18 mils and the microcellular structure is quite uniform. The open cell content, i.e. volume fraction of ruptured cells in the foam sheet, as determined using an air pycnometer, is about 40% or less.

Figure 2:
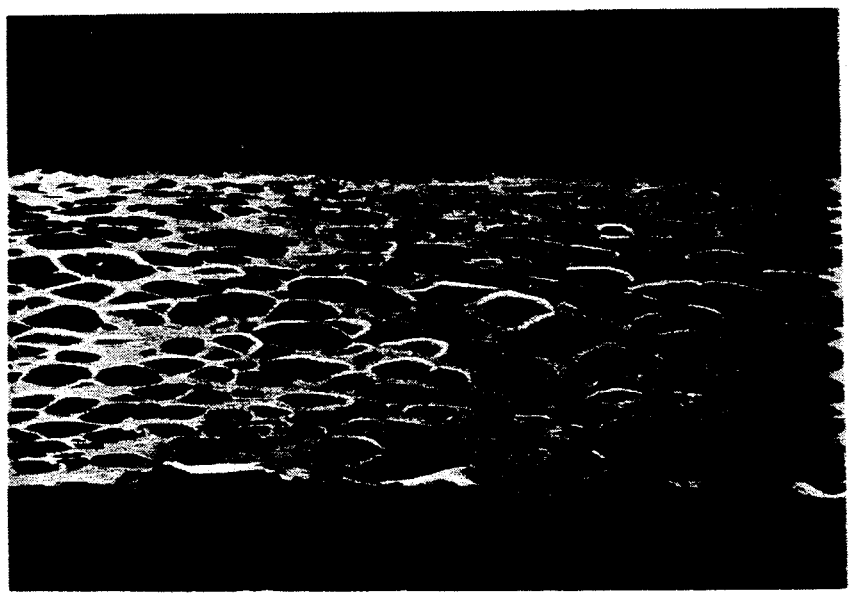
FIG. 2 is a scanning electron microscope (SEM) micrograph of a cross section of a polypropylene foam sheet prepared from polypropylene resin A-6.
Figure 3:
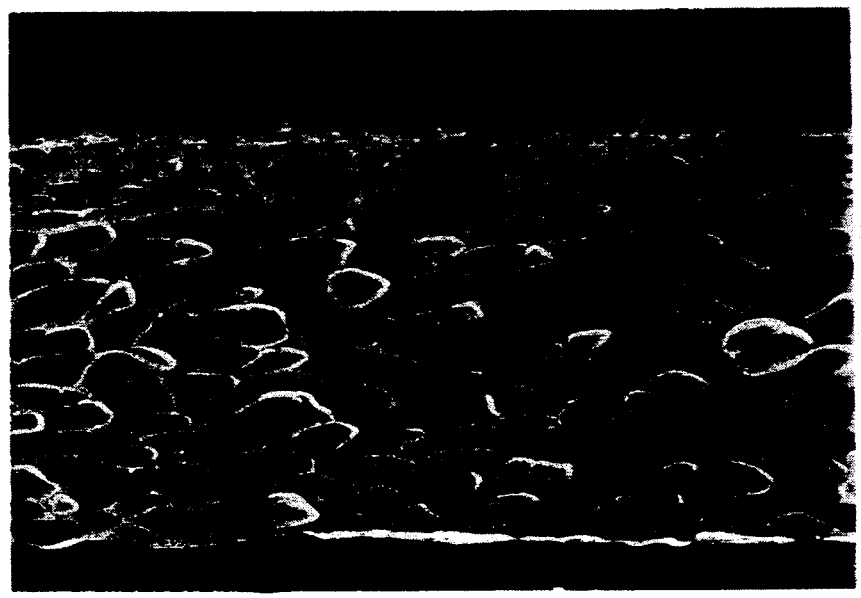
FIG. 3 is an SEM micrograph of a cross section of a polypropylene foam sheet prepared from polypropylene resin A-7.
Figure 4:
FIG. 4 is an SEM micrograph of a cross section of a polypropylene foam sheet prepared from polypropylene resin A-2.
Figure 5:
FIG. 5 is an SEM micrograph of a cross section of a polypropylene foam sheet prepared from polypropylene resin A-17.

Acceptable foams, prepared from polypropylene resins having the specific molecular and rheological characteristics described hereinbefore, are shown in FIG. 2 and 3. Unacceptable foams, prepared from polypropylene resins not having the requisite characteristics, eristics, are shown in FIG. 4 and 5.

In accordance with the present invention, the polypropylene foam sheet of the invention can be utilized to form rigid or semirigid articles. Such articles can be formed by a thermoforming process which comprises heating the foam sheet of the invention to a temperature where it is deformable under pressure or vacuum, supplying the softened foam sheet to a forming mold and cooling the foamed sheet to form a rigid or semi-rigid article having the shape of the forming mold. The excess foam sheet material, if any, can then be trimmed from the shaped article.

The following illustrative embodiments are given for the purpose of illustrating the instant invention and the invention is not limited to any of the specific materials or conditions used in the examples.

The various polypropylene resins employed in the illustrative and comparative examples are listed in Table 1, together with their molecular and rheological characteristics.

EXAMPLE 1

"High melt strength" (HMS) polypropylene resin, identified as A-6 in Table 1, having an MFR of 3.4 g/10 min, was processed into foam sheets, in accordance with the following procedure.

Resin pellets were fed at the rate of 115 lbs/hr from a resin feeder into a 2½ inch primary extruder with a 32/1 L/D screw. A stoichiometric mixture of citric acid and sodium bicarbonate was added simultaneously at the rate of 0.18 lbs/hr from a separate feeder into the same port in the extruder. The heating zones in the primary extruder were maintained at 350° F. (zone 1), 370° F. (zone 2) and 410° F. (zones 3-5). The screw speed was 135 rpm and the internal pressure in the extruder was 2600 psi. Isopentane was injected into the center zone of the primary extruder at the rate of 4.4 lbs/hr. After plastication and mixing in the primary extruder, the mixture to be foamed was transferred at a melt temperature of 372° F. through the crossover which was at 355° F. into a 3½ inch secondary extruder with a 24/1 L/D screw. The four heating zones in the secondary extruder were maintained at 345° F., 340° F., 330° F. and 325° F., respectively. The screw speed was 19 rpm and the pressure in the extruder was 800 psi. The foaming mixture at a melt temperature of 283° F. was pumped into the die which was maintained at 325° F. The speed of the melt pump was 50 rpm and the die pressure was 200 psi.

The mixture was extruded through a circular die with a die lip diameter of 3.0 inches. The foamed tubular extrudate, which was cooled by 70° F. air from an air ring attached to the die lip, was pulled over an 8 inch diameter cooling/sizing drum which was maintained at about 73° F. The distance between the die and the drum was 6 inches. The outer surface of the extrudate was cooled by 70° F. air from an air ring around the drum. The tubular extrudate was taken up on a winder after going through an S-wrap. Alternatively, the tubular extrudate was slit as it passed over the drum and was then taken up on a winder. The take-up speed was 8.9 feet/min. The time for passage of the resin through the primary and secondary extruders was about 20 min.

The polypropylene foam sheet, prepared as described above, had a smooth surface and a uniform cell size and distribution, as shown in the SEM micrograph in FIG. 2. The properties of the foam sheet, determined after a 72 hr aging period, are summarized in Table 2 in Example 5.

TABLE 1

| | CHARACTERIZATION OF POLYPROPYLENE RESINS | | | | | | | |
|---|---|---|---|---|---|---|---|---|
| Resin | A-1 | A-2 | A-3 | A-6 | A-7 | A-10 | A-17 | A-20 |
| Manufacturer | Himont | Himont | Himont HMS | Himont HMS | Himont HMS | Himont HMS | Exxon HMS | Himont |
| Designation | 6431 | 6331 | XA 17054 | X8603-78-1 | X8603-74-1 | 17106-2 | PD020 | 6523 |
| MFR, g/10 min (230° C., 2.16 kg) | 7.5 | 12.0 | 9.0 | 3.4 | 7.0 | 7.0 | 0.3 | 4.0 |
| $[\eta]$, dl/g | 1.26 | 1.10 | 1.18 | 1.04 | 1.07 | 1.01 | 1.77 | 1.61 |
| $M_w (\times 10^3)$ | 241.0 | 219.4 | 419.6 | 365.8 | 326.2 | 306.1 | 382.3 | 315.5 |
| $M_n (\times 10^3)$ | 39.1 | 41.0 | 41.2 | 41.3 | 41.1 | 42.7 | 48.4 | 41.1 |
| $M_w/M_n$ | 6.17 | 5.36 | 10.20 | 8.86 | 7.92 | 7.15 | 7.90 | 7.68 |
| $M_z (\times 10^3)$ | 665.8 | 546.7 | 1556.9 | 1455.6 | 1257.9 | 1214.1 | 980.5 | 852.0 |
| $M_z/M_w$ | 2.76 | 2.49 | 3.71 | 3.98 | 3.87 | 3.97 | 2.57 | 2.70 |
| $J_{eo} (\times 10^{-5})$, cm$^2$/dyne | 8.8 | 1.0 | 19.0 | 22.0 | 14.0 | 15.0 | 3.3 | 3.7 |
| Sr/S ($\times 10^{-5}$) at 1 sec$^{-1}$, cm$^2$/dyne | 4.0 | 3.2 | 8.8 | 10.5 | 5.5 | 8.1 | 2.9 | 2.8 |
| GPC | monomodal | | | bimodal | | | | monomodal |
| Structure | linear | | | major-linear; minor-branched | | | | linear |

EXAMPLE 2

HMS polypropylene resin, identified as A-7 in Table 1, was processed into foam sheet in the same manner as described in Example 1.

The resin pellets were fed into the primary extruder at a rate of 117 lbs/hr while the citric acid-sodium bicarbonate mixture was fed separately at the rate of 0.61 lbs/hr. Zones 1-5 in the extruder were maintained at 340° F., 370° F., 410° F., 420° F. and 420° F., respectively. The screw speed was 140 rpm and the extruder pressure was 1730 psi. Isopentane was injected at the rate of 2.70 bls/hr. The mixture to be foamed was transferred at a melt temperature of 288° F. through the crossover which was at 350° F. into the secondary extruder. The four zones in the extruder were maintained at 320° F., 328° F., 325° F. and 325° F., respectively. The screw speed was 13 rpm and the extruder pressure was 830 psi. The molten foaming mixture at 288° F. was pumped into the die which was at 325° F. The die pressure was 190 psi and the melt pump speed was 50 rpm. The mixture was extruded through the circular die and pulled over the cooling/sizing drum which was maintained at about 78° F. The tubular extruder was taken up at a line speed of 9.3 ft/min. The foam sheet had a smooth surface and a uniform cell size and microstructure, as shown in the SEM micrograph in FIG. 3. The properties of the foam sheet are summarized in Table 2 in Example 5.

EXAMPLE 3—Comparative

HMS polypropylene resin, identified as A-17 in Table 1, was processed under the same conditions as described in Example 1. The resultant foamed extrudate could not be pulled over the cooling/sizing drum. The sheet was a very poor foam and had a lumpy surface and a non-uniform microstructure, as shown in the SEM micrograph in FIG. 5.

EXAMPLE 4—Comparative

A conventional polypropylene resin, identified as A-20 in Table 1, was processed under the same conditions as described in Example 1. The resultant extrudate could not be pulled over the cooling/sizing drum. The sheet was a very poor foam and not acceptable for thermoforming or other applications because of its poor appearance, rough surface and non-uniform microstructure.

EXAMPLE 5

The characteristics of the resins used in Examples 1-4 are shown in Table 2. The properties of the polypropylene foam sheets prepared in illustrative Example 1 and 2 from resins A-6 and A-7, respectively, are summarized in Table 2. The polypropylene foam sheets prepared in comparative Examples 3 and 4 from resins A-17 and A-20, respectively, were very poor and unacceptable in appearance and the properties could not be determined.

TABLE 2
POLYPROPYLENE RESIN AND FOAM SHEET PROPERTIES

| | Illustrative | | Comparative | |
|---|---|---|---|---|
| Example | 1 | 2 | 3 | 4 |
| Resin No. | A-6 | A-7 | A-17 | A-20 |
| Resin properties | | | | |
| $M_z (\times 10^3)$ | 1455.6 | 1257.9 | 980.5 | 852.0 |
| $M_z/M_w$ | 3.98 | 3.87 | 2.57 | 2.70 |
| $J_{eo} (\times 10^{-5})$, cm$^2$/dyne | 22.0 | 14.0 | 3.3 | 3.7 |
| $S_r/S (\times 10^{-5})$ at 1 sec$^{-1}$, cm$^2$/dyne | 10.5 | 5.5 | 2.9 | 2.8 |
| Foam sheet properties | acceptable | acceptable | unacceptable | unacceptable |
| Surface | smooth | smooth | rough | rough |
| Microstructure | uniform | uniform | non-uniform | non-uniform |
| Thickness, mils | 115 | 83 | | |
| Density, lb/ft$^3$ | 11.2 | 14.8 | | |
| Flexural modulus, psi | 18,715 | 29,400 | | |
| Cell size, mils | 15.1 | 9.6 | | |
| Open cell content, % | 15.8 | 22.0 | | |

The data clearly show that acceptable foam sheets were produced in Examples 1 and 2, wherein the polypropylene resins had the requisite molecular and rheological characteristics disclosed hereinbefore, while poor, unacceptable foam sheets were produced in Examples 3 and 4, wherein the resins possessed none or only one of these characteristics. Although resin A-17, used in Example 3, is a high molecular weight polypropylene, marketed as a "high melt strength" resin and has an $M_z$ value very close to the lower limit required for the preparation of acceptable foams, the other characteristics, particularly the rheological properties, are far below the necessary levels and the resultant foam sheet was very poor and unacceptable, as shown in FIG. 5.

EXAMPLE 6

HMS polypropylene resin, identified as A-6 in Table 1, was processed in the same manner as described in Example 1. The resin pellets were charged into the extruder at a rate of 118 lbs/hr while the citric acid-sodium bicarbonate nucleating agent mixture was added at the rate of 0.22 lbs/hr. The blowing agent isopentane was injected at the rate of 2.3 lbs/hr. The die pressure was 190 psi and the temperature of the melt pumped into the die was 284° F. The extrudate was pulled over the cooling/sizing drum and taken up on the winder at a speed of 8.2 ft/min.

The polypropylene foam sheet had a smooth surface and a uniform cell size and microstructure. The thickness of the foam sheet was 113 mils, the density was 12.3 lbs/ft$^3$ and the flexural modulus was 24,485 psi. The average cell size was 10.4 mils and the open cell content was 25.3%.

EXAMPLE 7—Comparative

A conventional polypropylene resin, identified as A-2 in Table 1, was processed in the same manner as described in Example 1. The resin pellets were charged at the rate of 102 lbs/hr while the citric acid-sodium bicarbonate nucleating agent and the isopentane blowing agent were charged at the rate of 0.83 and 270 lbs/hr, respectively. The extrudate had a very poor appearance with a rough surface and a non-uniform cell structure, as shown in the SEM micrograph in FIG. 4.

EXAMPLE 8

HMS polypropylene resin identified as A-10 in Table 1, having an MFR of 7.0 g/10 min, was processed in the same manner as described in Example 1. The resin pellets, citric acid-sodium bicarbonate and isopentane were charged at the rate of 117, 0.30 and 2.9 lbs/hr, respectively. Zones 1-5 in the primary extruder were maintained at 350° F., 380° F., 410° F., 410° F. and 410° F., respectively, the screw speed was 153 rpm and the pressure in the extruder was 1750 psi. The mixture to be foamed was transferred at a melt temperature of 360° F. through the crossover, which was maintained at 350° F., into the secondary extruder. Zones 1-4 in the latter were maintained at 320° F. The screw speed was 20 rpm and the pressure in the extruder was 800 psi. The mixture at a melt temperature of 285° F. was pumped into the die which was maintained at a temperature of 320° F. The speed of the melt pump was 50 rpm and the die pressure was 220 psi. The extrudate from a circular die was cooled by 70° F. air as it exited the die and as it was pulled over the cooling/sizing drum. The latter was maintained at 80° F. The take-up speed was 10.0 ft/min.

The polypropylene foam sheet had a smooth surface and a homogeneous cell structure. The sheet thickness was 101 mils, the density was 8.55 lbs/ft$^3$ and the flexural modulus was 13,700 psi. The average cell size was 12.4 mils and the open cell content was about 40%.

EXAMPLE 9—Comparative

Conventional polypropylene resin identified as A-1 in Table 1, was processed in the same manner as described in Example 1. The foamed extrudate had an uneven surface and a non-uniform cell structure.

EXAMPLE 10

HMS polypropylene resin identified as A-3 in Table 1, having an MFR of 9.0 g/10 min, was processed into foam sheets using the tandem extrusion line and conditions described in Example 1, with chlorodifluoromethane (HCFC22) as blowing agent and talc as nucleating agent. The foaming mixture contained 110 lbs resin, 7.10 lbs HCFC22 and 2.90 lbs talc. The foam sheet prepared from resin A-3 had a smooth surface and the cell structure was homogeneous. The sheet had a thickness of 96 mils, a density of 6.3 lbs/ft$^3$ and a flexural modulus of 12,700 psi.

EXAMPLE 11—Comparative

HMS polypropylene resin identified as A-17 in Table 1, having an MFR of 0.3 g/10 min but lacking the requisite rheological characteristics, was processed in the same manner as described in Example 10. The resin was charged at the rate of 85.9 lbs/hr while HCFC22 and talc were charged at the rate of 6.70 and 3.40 lbs/hr, respectively. The extrudate had a very poor surface appearance and a non-uniform cell structure. These results are similar to those obtained with the same resin using isopentane as blowing agent and citric acid-sodium bicarbonate as nucleating agent, as described in Example 3.

EXAMPLE 12—Thermoforming

Foam sheet having a poor appearance with a rough surface and a non-uniform cell structure could not be thermoformed into shaped articles with a smooth, acceptable surface. Acceptable, good quality foam sheet with a smooth surface and uniform cell structure could be thermoformed into good quality shaped articles.

The good quality polypropylene foam sheet prepared from resin A-6 in Example 1 and having a thickness of 115 mils, a density of 11.2 lbs/ft$^3$, an average cell size of 15.6 mils and an open cell content of 15.8%, was thermoformed in a Comet Model 24×24 apparatus with matched mold tooling to form an 8 oz round bowl. The foam sheet was placed between the top and bottom sections of the mold which were at a temperature of 290° F. The heating time was 120 sec with a dwell time of 15 sec. The reduced pressure on the sheet in the mold was 20 inches Hg. The thermoformed bowl had a smooth surface and good appearance. Test specimens taken from the bottom of the bowl had a tensile modulus of 14,300 psi, a tensile stress of 441 psi, a tensile strain of 4.1% and an energy-to break of 19.3 inch-lbs.

EXAMPLE 13

EPO Pat. Application EP 71,981 discloses the preparation of foamed molded articles from polypropylene resins having a latent heat of crystallization of 9–28 cal/g.

Several polypropylene resins identified in Table 1, were subjected to differential scanning calorimetric analyses to determine the latent heat of crystallization. The results are summarized in Table 3.

TABLE 3

| LATENT HEAT OF CRYSTALLIZATION OF RESINS | | |
| --- | --- | --- |
| Polypropylene Resin | Latent H$_{cr}$ cal/g | Foam Sheet Quality |
| A-1 | 23.97 | Unacceptable |
| A-17 | 22.76 | Unacceptable |
| A-6 | 22.62 | Acceptable |
| A-7 | 23.24 | Acceptable |

It is apparent that the latent heat of crystallization does not distinguish between those polypropylene resins which yield the acceptable foam sheets of the present invention and those that yield unacceptable non-uniform foam sheets.

EXAMPLE 14

U.S. Pat. No. 3,637,458 discloses the preparation of a foam sheet of a linear, thermoplastic polymer of film-forming molecular weight, substantially free from crosslinking and having a work-to-break value of at least 10,000 inch-lbs/in$^3$, and by the process of the cited patent, yielding a foam sheet having a maximum density of 0.03 g/cc (1.87 lbs/ft$^3$) and a cell size of at least 500 microns (19.5 mils).

The polypropylene foam sheet of the present invention has a minimum density of 2.5 lbs/ft$^3$ and a maximum cell size of 18 mils, both outside of the claims of the above cited U.S. patent.

Several polypropylene resins, identified in Table 1, were extruded at a melt temperature of 205°–250° C., on a twin-screw Brabender extruder rotating at 25–30 rpm, using a ribbon die and chill roll, to produce samples having a thickness of 3–5 mils. The test specimens, 5–9 per sample, were conditioned for 1–3 days at 72° F. at 50% RH prior to running Instron tests at a crosshead speed of 0.5 inch/min using a Type IV die (ASTM D638).

As shown in Table 4, those polypropylene resins which yield acceptable foam sheet when prepared by the process of the present invention, have a work-to-break value of less than 10,000 in-lbs/in$^3$, whereas resins having the work-to-break value of at least 10,000 in-lbs/in$^3$ claimed in the cited patent, yield non-uniform, unacceptable foam sheet.

TABLE 4

WORK-TO-BREAK OF POLYPROPYLENE RESINS

| Polypropylene Resin | Work-to-break in-lbs/in$^3$ | Foam Sheet Quality |
|---|---|---|
| A-1 | 16,490 | Unacceptable |
| A-17 | 16,010 | Unacceptable |
| A-6 | 6,300 | Acceptable |
| A-7 | 7,446 | Acceptable |

EXAMPLE 15

U.K. Pat. Application GB 2 099 434A discloses an extrusion process for preparing a foam extrudate from a polypropylene resin having a melt tension of at least 3 grams at 190° C. and a maximum/minimum melt tension ratio of not more than 2.5. The melt tension was measured by extruding the molten polymer, heated to 190° C., through a 2 mm orifice and then passing the extrudate through a tension-detecting pulley and winding it up at a speed of 5 cm/sec.

Two polypropylene resins (A-1 and A-17), which gave unacceptable foam sheets, and two polypropylene resins (A-6 and A-7), which gave acceptable foams, were subjected to the procedure for measurement of the melt tension at 190° C., as described in the cited U.K. patent application. At the temperature and throughput rate specified in the cited application, all of the polypropylene extrudates froze before reaching the take-up device.

Melt tension values for all four resins could be obtained at a higher temperature. The melt tension results shown in Table 5 were obtained at a melt temperature of 220° C. and a take-up speed of 3 cm/sec.

TABLE 5

MELT TENSION AND MOLECULAR WEIGHT PARAMETERS OF POLYPROPYLENE RESINS

| Polypropylene Resin | Foam Sheet Quality | Melt Tension, g | $MT_{max}$ $MT_{min}$ | $M_n$ ($\times 10^3$) | $M_w$ ($\times 10^3$) |
|---|---|---|---|---|---|
| A-1 | Unacceptable | 1.5 | 1.33 | 39.1 | 241.0 |
| A-7 | Acceptable | 4.1 | 1.17 | 41.1 | 326.2 |
| A-6 | Acceptable | 8.5 | 1.13 | 41.3 | 365.8 |
| A-17 | Unacceptable | 15.0 | 1.06 | 48.4 | 382.3 |

Although the absolute melt tension values would not be expected to be the same at 220° C. and at 190° C., the relative ranking should be the same. The data show that the melt tension values and the maximum/minimum ratio do not distinguish among those polypropylene resins which yield acceptable foams and those that yield unacceptable foams.

Molecular weight parameters for the various resins are shown in Table 5. It is apparent that the melt tension values increase with increasing molecular weight, as measured by $M_n$ and $M_w$. It has already been shown hereinbefore that both molecular and rheological characteristics at specified minimum levels are necessary to define the polypropylene resins which yield acceptable foams.

Although the density of the foamed product is not discussed in the cited U.K. patent application, the five illustrative examples disclose densities in the range of 0.023 to 0.036 g/cm$^3$ (1.44 to 2.25 lbs/ft$^3$). The present invention discloses densities of 2.5–25.0 lbs/ft$^3$.

The inability to obtain melt tension values at 190° C. for the polypropylene resins used herein, while such values are reported in the U.K. patent application, suggests that the resins reported therein were not polypropylene but were "polypropylene-type resins".

The polypropylene used in the examples in the cited patent application are not identified as to source, composition, etc. The polypropylene resins disclosed as usable in the process of the cited application are resins composed mainly of polypropylene including isotactic polypropylene, ethylene-propylene block copolymer, ethylene-propylene random copolymer and mixtures of two or more of the above mentioned polypropylene-type resins. In addition, polymers miscible with these polypropylene-type resins, such as high and low density polyethylenes, polybutene-1, ethylene copolymers with vinyl acetate, propylene and ethyl acrylate, styrene-butadiene rubber, ionomer and the like may be mixed with the above mentioned polypropylene-type resins, so far as polypropylene is the main component in the resulting mixture.

The polypropylene used in the cited U.K. Pat. Application GB 2 099 434A may have been one or more of the copolymers or mixtures disclosed therein and above.

What is claimed is:

1. A process for producing a foam sheet of a polypropylene characterized by at least
   (a) either z - average molecular weight $M_z$ of at least $1.0 \times 10^6$ or a ratio of the z - average molecular weight $M_z$ to weight average molecular weight $M_w$, and
   (b) either equilibrium compliance $J_{eo}$ of at least $12 \times 10^{-5}$ cm$^2$/dyne or recoverable shear strain per unit stress Sr/S of at least $5 \times 10^{-5}$ cm$^2$/dyne at 1 sec$^{-1}$, comprising the steps of mixing pelletized polypropylene with a nucleating agent, plasticating the mixture, introducing a physical blowing agent into the substantially plasticated mixture to form a foaming mixture, mixing and cooling the foaming mixture, extruding the foaming mixture into a foamed extrudate, and forming the foamed extrudate into a continuous foam sheet.

2. The process of claim 1, wherein said sheet has a density of 2.5–25.0 lbs/ft$^3$ and a flexural modulus of 10,000–50,000 psi.

3. The process of claim 1, wherein said sheet has a uniform cell structure with cells ranging from 5 to 18 mils and an open cell content of less than 40%.

4. The process of claim 1, wherein said sheet has a thickness of 0.020–0.200 inches.

5. The process of claim 1, wherein said sheet has a substantially non-cellular outer layer or skin on one or both sides.

6. The process of claim 1, wherein the physical blowing agent is selected from the group consisting of hydrocarbons, chlorinated hydrocarbons, chlorofluorocarbons, nitrogen, carbon dioxide and other inert gases.

7. The process of claim 6, wherein the physical blowing agent concentration is less than 25% by weight.

8. The process of claim 1, wherein said nucleating agent is selected from the group consisting of citric acid-sodium bicarbonare mixture, talc and titanium dioxide.

9. The process of claim 8, wherein said nucleating agent has a particle size of 0.3–5.0 microns and its concentration is less than 1% by weight.

10. The foam sheet of claim 5, wherein said sheet has a substantially non-cellular outer layer or skin on one or both sides.

* * * * *

REEXAMINATION CERTIFICATE (3882nd)

United States Patent
Park et al.

[11] B1 5,180,751
[45] Certificate Issued: Sep. 28, 1999

[54] POLYPROPYLENE FOAM SHEETS

[75] Inventors: John J. Park, Neenah, Wis.; Leon Katz, Stamford, Conn.; Norman G. Gaylord, New Providence, N.J.

[73] Assignee: James River Corporation of Virginia, Richmond, Va.

Reexamination Request:
No. 90/005,027, Jun. 29, 1998

Reexamination Certificate for:
Patent No.: 5,180,751
Issued: Jan. 19, 1993
Appl. No.: 07/886,818
Filed: May 22, 1992

Related U.S. Application Data

[62] Division of application No. 07/493,541, Mar. 14, 1990, Pat. No. 5,116,881.

[51] Int. Cl.$^6$ .................................................. C08J 9/34
[52] U.S. Cl. ..................... 521/51; 264/45.1; 264/45.5; 264/51; 264/53; 264/54; 521/79; 521/142; 521/143; 521/144
[58] Field of Search ................... 521/51, 79, 134, 521/142, 143, 144; 264/51, 53, 54, 45.1

[56] References Cited

U.S. PATENT DOCUMENTS

| | | | |
|---|---|---|---|
| 3,857,914 | 12/1974 | Aishima et al. | 264/45.5 |
| 4,221,624 | 9/1980 | Eslinger et al. | 156/243 |
| 4,578,297 | 3/1986 | Duncan | 428/35 |
| 4,940,736 | 7/1990 | Alteepping et al. | 521/98 |
| 5,731,362 | 3/1998 | Scheve et al. | 521/142 |

FOREIGN PATENT DOCUMENTS

| | | |
|---|---|---|
| 0 181 637 | 5/1986 | European Pat. Off. |
| 57-197132 | 12/1982 | Japan. |

OTHER PUBLICATIONS

S. Yamada, *Additives for Plastics: Basics and Application* (Taiseisha K.K. Tokyo 1975).

*Primary Examiner*—Morton Foelak

[57] ABSTRACT

A thermoformable, rigid or semi-rigid polypropylene foam sheet having a smooth surface and a uniform cell structure and a density of at least 2.5 lbs/ft$^3$ is prepared by extruding a mixture of a nucleating agent, a physical blowing agent and a polypropylene resin having a high melt strength and high melt elasticity.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *